United States Patent
Shimizu et al.

(12)

(10) Patent No.: US 6,303,240 B1
(45) Date of Patent: Oct. 16, 2001

(54) SOFT MAGNETIC THIN FILM

(75) Inventors: Osamu Shimizu; Kanji Nakanishi, both of Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 08/479,843

(22) Filed: Jun. 7, 1995

Related U.S. Application Data

(63) Continuation of application No. 08/001,239, filed on Jan. 6, 1993, now abandoned, which is a continuation of application No. 07/504,165, filed on Apr. 3, 1990, now abandoned.

(30) Foreign Application Priority Data

Apr. 3, 1989 (JP) .................................................... 1-81606

(51) Int. Cl.7 ...................................................... G11B 5/66
(52) U.S. Cl. ...................... 428/692; 428/694 T; 428/900; 420/128; 420/462; 148/306; 148/318
(58) Field of Search ............................... 428/694 T, 692, 428/900; 420/128, 462; 148/306, 318

(56) References Cited

U.S. PATENT DOCUMENTS

| | | | | |
|---|---|---|---|---|
| 3,663,767 | * | 5/1972 | Shimotori et al. ................... | 360/122 |
| 4,190,438 | * | 2/1980 | Aso et al. ............................ | 148/304 |
| 4,271,232 | * | 6/1981 | Heiman et al. ...................... | 428/332 |
| 4,623,408 | * | 11/1986 | Karamon et al. .................... | 148/403 |
| 4,673,610 | * | 6/1987 | Shirahata et al. .................... | 428/213 |
| 4,683,012 | * | 7/1987 | Yamauchi et al. ................... | 148/301 |
| 4,772,976 | | 9/1988 | Otomo et al. ........................ | 360/125 |
| 4,791,021 | * | 12/1988 | Honda et al. ......................... | 428/329 |
| 4,814,921 | * | 3/1989 | Hamakawa et al. ................. | 360/126 |
| 4,858,049 | * | 8/1989 | Kobayashi et al. .................. | 360/126 |
| 4,904,543 | | 2/1990 | Sakakima et al. ................... | 428/627 |
| 4,935,314 | * | 6/1990 | Kobayashi et al. .................. | 428/694 |

FOREIGN PATENT DOCUMENTS

| | | |
|---|---|---|
| 286124 | 10/1988 | (EP) . |
| 303324 * | 2/1989 | (EP) . |
| 197916 * | 9/1987 | (JP) . |
| A-64-42108 | 2/1989 | (JP) . |
| A-1-229408 | 9/1989 | (JP) . |

OTHER PUBLICATIONS

Thermal Stability of Compositionally Modulated Amorphous Nitride Alloy Films, Sakakima et al, The Journal of the Magnetics Society of Japan, vol. 12, No. 2, (1988), pp. 299–304.

Magnetics Properties of Amorphous Films Prepared by $N_2$ Reactive Sputtering, Sakakima et al, IECE Technical Report MR 86–4, vol. 86, No. 27. pp. 25–32 (IECE: Institute of Electronics & Communication Engineers of Japan, 1986.

* cited by examiner

*Primary Examiner*—Leszek Kiliman
(74) *Attorney, Agent, or Firm*—Sughrue, Mion, Zinn, Macpeak & Seas, PLLC

(57) ABSTRACT

A soft magnetic thin film having a compositional formula $Fe_aB_bN_c$, wherein a, b and c each denote atomic percent and B denotes at least one of Co, Ni and Ru, and wherein the compositional range is given by $0<b\leqq5$, and $0<c\leqq5$. The film may exhibit uniaxial anisotropy with a uniaxial anisotropy field strength of 1–5 Oe. The film has a coercivity 2.5–4 Oe or less and a saturated magnetic flux density $B_{25}$ of at least 16 kG measured at a magnetic field of 25 Oe.

The film is produced by subjecting a deposited thin film of the compositional formula to heat treatment at a temperature of 220 to 450° C., within or without magnetic field and, has an average crystal grain size of not more than 50 nm.

15 Claims, No Drawings

SOFT MAGNETIC THIN FILM

This is a Continuation of application Ser. No. 08/001,239 filed Jan. 6, 1993, now abandoned, which is a Continuation of application Ser. No. 07/504,165 filed Apr. 3, 1990, now abandoned.

FIELD OF THE INVENTION

This invention relates to a soft magnetic thin film useful for example for a core material for a magnetic head.

BACKGROUND

In a magnetic recording and/or reproducing apparatus, such as an audio tape recorder or a video tape recorder (VTR), the tendency is towards increasing the recording density and the quality of the recording signals. In keeping with such tendency towards increasing the recording density, a so-called metal tape in which powders of metals such as Fe, Co or Ni or alloys thereof are used as magnetic powders, or a so-called vapor-deposited tape in which a magnetic metal material is directly applied to a base film by a vacuum thin film forming technique, has been developed as the magnetic recording medium, and put into practical use in many fields.

PROBLEMS IN THE ART

For exhibiting the properties of the magnetic recording medium having predetermined coercivities, the core material of the magnetic head need to exhibit a high saturated magnetic flux density and, when the same magnetic head is also used for reproduction, the core material also need to exhibit high magnetic permeability simultaneously. However, the ferrite material used frequently as the core material of the magnetic head has a low saturated magnetic flux density, whereas the permalloy is poor in wear resistance.

As the core material satisfying these various requirements, a Sendust alloy composed of an Fe—Al—Si alloy has been devised so being a suitable material, and put to practical use.

It is however desirable for a material exhibiting superior soft magnetic properties, such as the Sendust alloy, to exhibit magnetostriction λs and crystal magnetic anisotropy K which are both close to zero. Thus the composition of a material that may be used in a magnetic head is determined with both of these two parameters taken into consideration. In this manner, the saturated magnetic flux density is unequivocally determined as a function of the composition and, in case of the Sendust alloy, the limit of the saturated magnetic flux density is set to 10 to 11K gauss.

For this reason, a Co base amorphous magnetic alloy material, so-called amorphous magnetic alloy material, which is hardly lowered in permeability in the high frequency range while exhibiting a high saturated magnetic flux density, has been developed to take the place of the Sendust alloy. However, with this amorphous magnetic alloy material, the saturation magnetic flux density is in the order of 14K gauss.

SUMMARY OF THE DISCLOSURE

It is an object of the present invention to provide a novel soft magnetic thin film having a saturated magnetic flux density higher than that of the above mentioned conventional materials.

According to the present invention, the above mentioned object may be accomplished by a soft magnetic thin film having a compositional formula $Fe_a B_b N_c$, wherein a, b and c each denote atomic percent and B denotes at least one of Co, Ni and Ru, and wherein the compositional range is given by $$0 < b \leq 5,$$

and $$0 < c \leq 5.$$

In a preferred embodiment, the soft magnetic thin film exhibits uniaxial anisotropy.

The soft magnetic thin film of the present invention contains Fe and N, and at least one of the specific additional elements "B", i.e., Co, Ni or Ru in the predetermined compositional range aforementioned, so that it exhibits a high saturated magnetic flux density, such as $B_{25} > 14$ kG, and a low coercivity. The soft magnetic thin film of the present invention can also be of uniaxial anisotropy. Hence, it may be used advantageously as a magnetic head core material.

PREFERRED EMBODIMENTS

The soft magnetic thin film of the present invention contains Fe, N and a specified additional element or elements termed "B", that is at least one of Co, Ni and Ru, wherein Fe, N and the additional element or elements B are within the above specified compositional range.

Since N and the specified additional elements B are contained in amounts of not more than 5 atomic percent, the coercivity Hc is low (Hc<4 Oe) while a saturation magnetic flux density Bs of not less than a predetermined value of about 16 kG is maintained.

Although the additional element B exhibits a significant effect when contained in an amount of, for example, 0.1 atomic percent, it is contained preferably in an amount of not less than 0.5 atomic percent, more preferably in an amount of 1 atomic percent. When the additional element exceeds 5 atomic percent, the coercivity Hc occasionally exceeds a desired value, so that the additional element(s) are contained in an amount of not more than 5 atomic percent.

Although N exhibits an effect of a practical meaning when contained in an amount of 0.1 atomic percent, it is preferably contained in an amount of not less than 0.5 atomic percent. When N is contained in an amount in excess of 5 atomic percent, the coercivity occasionally exceeds a desired value, so that N is contained in an amount of not more than 5 atomic percent.

Preferably, the soft magnetic thin film of the present invention exhibits uniaxial anisotropy. In this case, by having the hard axis for magnetization of the thin film as the direction of magnetization, it is possible to increase the permeability at a frequency higher than 1 MHz sufficiently. Therefore, the film is highly useful as the magnetic head core material. For obtaining high permeability at higher frequencies, it is necessary to provide uniaxial anisotropy preferably not lower than 1 Oe and more preferably in the order of 2 to 5 oe in terms of the strength of the anisotropic magnetic field. When high permeability is desired at not lower than, for example, 10 MHz, the desired value of uniaxial anisotropy is in the order of 3 to 5 Oe.

The additional element(s) "B" are one or more of Co, Ni and Ru.

For producing the soft magnetic thin film of the present invention, the thin film of the above mentioned specified composition is produced by a vapor deposition method, such as the RF sputtering method, and heat treating (or annealing) the thin film preferably at 220° to 450° C., for partially or wholly crystallizing the thin film in the case where the thin film is amorphous. The average crystal grain size of the heat treated (annealed) thin film is preferably not more than 50 nm (500 Å) and more preferably not more than 30 nm (300 Å). When heat treatment is performed at a temperature lower than 220° C. or exceeding 450° C., it would occasionally fail to produce a soft magnetic thin film of the desired low coercivity. More preferably, the above mentioned heat treatment is performed in a magnetic field to induce uniaxial magnetic anisotropy for partially or entirely crystallizing the thin film. The above mentioned magnetic field is preferably sufficiently larger than the demagnetizing field of the thin film.

When the soft magnetic thin film is formed on a base plate by the above mentioned method, various properties of the produced soft magnetic films may vary occasionally from one base plate to another depending on the kind. Therefore, it is more desirable to make proper selection of the base plate prior to the preparation of the thin film.

EXAMPLES

Examples 1 to 9

Using a target of an Fe—Co alloy and a gaseous atmosphere of Ar and $N_2$, thin films of various compositions were formed on a sapphire base plate by an RF sputtering method. The film compositions were varied by changing the Co contents in the target and $N_2$ partial pressure in the gaseous atmosphere. The sputtering conditions were the cathode power of 200 W and the total gas pressure (Ar+$N_2$) of 2.0 Pa. The thin films were heat-treated at 350° for one hour in a magnetic field of 1 kOe to produce soft magnetic thin films of the Examples 1 to 9. The B-H curves were measured on these soft magnetic thin films. The B-H curves were measured at a measurement magnetic field Hm=25 Oe and the frequency of 50 Hz to find the coercivity Hc along the easy axis for magnetization and the magnetic flux density $B_{25}$ under the magnetic field of 25 Oe. The measured results are shown in Table 1.

Examples 10 to 18

The soft magnetic thin films were prepared in the same way as in Examples 1 to 9 except using the Fe—Ni alloy target in lieu of the Fe—Co alloy target. The coercivity Hc and the magnetic flux density $B_{25}$ of each of these soft magnetic thin films were measured in the same way as in Examples 1 to 9. The measured results are shown in Table 2.

Examples 19 to 27

The soft magnetic thin films were produced in the same way as in Examples 1 to 9 except using the Fe—Ru alloy target in lieu of the Fe—Co alloy target used in the Examples 1 to 9. The coercivity Hc and the magnetic flux density $B_{25}$ of each of these soft magnetic thin films were measured in the same way as in Examples 1 to 9. The measured results are shown in Table 3.

The strength of the anisotropic magnetic field of the soft magnetic thin films of the above Examples 1 to 27 was in the order of 2 to 5 Oe.

In the above Examples 1 to 27, isotropic soft magnetic thin films having similar values of the coercivity Hc and the magnetic flux density $B_{25}$ were produced by simply heat treating the thin films at 350° C. for one hour. Comparative Examples 1 to 3

Thin films were produced in the same way as in Examples 1 to 9 except using an Fe target in lieu of the Fe—Co alloy target and not having $N_2$ contained in the gaseous atmosphere (Comparative Example 1).

Thin films were also produced in the same way as in Examples 1 to 9 except using the Fe target in lieu of the Fe—Co alloy target (Comparative Examples 2 to 3). The coercivity Hc and the magnetic flux density $B_{25}$ of these thin films were measured by a method described in the above Examples 1 to 9. The measured results are shown in Table 4.

It is seen from Tables 1 to 4 that, since the soft magnetic thin film of the present invention contains N and the additional element(s) B in the above specified ratios, it has low coercivity and a high magnetic flux density.

TABLE 1

| Example No. | Fe (at %) | Co (at %) | N (at %) | Hc (Oe) | $B_{25}$ (kG) |
|---|---|---|---|---|---|
| 1 | 98.0 | 1.4 | 0.6 | 2.5 | 18.3 |
| 2 | 96.5 | 1.4 | 2.1 | 1.3 | 17.0 |
| 3 | 94.1 | 1.4 | 4.5 | 0.6 | 17.7 |
| 4 | 96.4 | 2.9 | 0.7 | 2.0 | 18.9 |
| 5 | 95.0 | 2.9 | 2.1 | 1.1 | 17.5 |
| 6 | 92.7 | 2.9 | 4.4 | 1.5 | 16.6 |
| 7 | 95.1 | 4.3 | 0.6 | 1.7 | 17.4 |
| 8 | 93.5 | 4.3 | 2.2 | 1.5 | 18.8 |
| 9 | 91.7 | 4.3 | 4.0 | 2.3 | 16.1 |

TABLE 2

| Example No. | Fe (at %) | Ni (at %) | N (at %) | Hc (Oe) | $B_{25}$ (kG) |
|---|---|---|---|---|---|
| 10 | 98.3 | 1.1 | 0.6 | 2.4 | 19.2 |
| 11 | 96.9 | 1.1 | 2.0 | 1.3 | 18.4 |
| 12 | 94.5 | 1.1 | 4.4 | 1.5 | 16.9 |
| 13 | 97.2 | 2.2 | 0.6 | 2.4 | 17.5 |
| 14 | 95.7 | 2.2 | 2.1 | 2.0 | 16.4 |
| 15 | 93.3 | 2.2 | 4.5 | 1.9 | 17.5 |
| 16 | 95.8 | 3.5 | 0.7 | 1.7 | 18.6 |
| 17 | 94.4 | 3.5 | 2.1 | 1.2 | 18.4 |
| 18 | 91.9 | 3.5 | 4.6 | 1.2 | 17.4 |

TABLE 3

| Example No. | Fe (at %) | Ru (at %) | N (at %) | Hc (Oe) | $B_{25}$ (kG) |
|---|---|---|---|---|---|
| 19 | 98.3 | 1.0 | 0.7 | 1.3 | 17.7 |
| 20 | 96.8 | 1.0 | 2.2 | 1.1 | 18.2 |
| 21 | 94.4 | 1.0 | 4.6 | 1.2 | 16.3 |
| 22 | 96.8 | 2.5 | 0.7 | 3.2 | 16.2 |
| 23 | 95.2 | 2.5 | 2.3 | 1.1 | 20.3 |
| 24 | 92.7 | 2.5 | 4.8 | 2.0 | 17.4 |
| 25 | 95.4 | 4.8 | 0.8 | 0.9 | 18.5 |
| 26 | 92.7 | 4.8 | 2.5 | 0.7 | 18.1 |
| 27 | 90.4 | 4.8 | 4.8 | 3.5 | 16.1 |

TABLE 4

| * No. | Fe (at %) | B (at %) | N (at %) | Hc (Oe) | $B_{25}$ (kG) |
|---|---|---|---|---|---|
| 1 | 100 | — | — | 10.5 | 17.7 |
| 2 | 98.6 | — | 1.4 | 4.2 | 18.8 |
| 3 | 97.0 | — | 3.0 | 5.6 | 17.0 |

*Comparative Examples

It should be noted that modifications in the art may done without departing from the inventive concept disclosed in the entire disclosure within the inventive scope defined by the appended claims.

What is claimed is:

1. A soft magnetic thin film consisting essentially of a single layer of a $Fe_aB_bN_c$ composition, wherein a, b and c each denote atomic percent, provided that a+b+c=100, and B denotes at least one of Co, Ni and Ru, and wherein the compositional range is given by $$0<b\leq5,$$

and $$0<c<5,$$

wherein said composition is substantially uniform along the thickness of the film, and wherein said magnetic film has a coercivity not exceeding 2.5 Oe and a saturation magnetic flux density $B_{25}$ of at least 16 kG measured at a magnetic field of 25 Oe.

2. The soft thin magnetic film according to claim 1, wherein the film exhibits uniaxial anisotropy.

3. The soft thin magnetic film according to claim 1, wherein b is at least 0.5 atomic percent and c is at least 0.5 atomic percent.

4. The soft thin magnetic film according to claim 3, wherein b is at least 1 atomic percent.

5. The soft thin magnetic film according to claim 2, which has a uniaxial anisotropy field strength of at least 1 Oe.

6. The soft thin magnetic film according to claim 5, which has a uniaxial anisotropy field strength of 2 to 5 Oe.

7. The soft thin magnetic film according to claim 1, which has been produced by subjecting a deposited thin film having said compositional formula to heat treatment at a temperature of 220 to 450° C.

8. The soft thin magnetic film according to claim 1, which has an average crystal grain size of not more than 50 nm.

9. The soft thin magnetic film according to claim 7, which has an average crystal grain size of not more than 50 nm.

10. The soft thin magnetic film according to claim 7, which has an average crystal grain size of not more than 30 nm.

11. The soft thin magnetic film according to claim 2, which has been produced by subjecting a deposited thin film having said compositional formula to heat treatment at a temperature of 220 to 450° C. within a magnetic field.

12. The soft thin magnetic film according to claim 11, which has an average crystal grain size of not more than 50 nm.

13. The soft thin magnetic film according to claim 2, which has an average crystal grain size of not more than 50 nm.

14. The soft thin magnetic film according to claim 1, wherein B denotes Co.

15. The soft thin magnetic film according to claim 1, wherein B denotes Ni.

* * * * *